United States Patent
Mordukhovich

(10) Patent No.: US 7,000,752 B2
(45) Date of Patent: Feb. 21, 2006

(54) COATED REACTION PLATE FOR A CLUTCH

(75) Inventor: Gregory Mordukhovich, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 2 days.

(21) Appl. No.: 10/833,916

(22) Filed: Apr. 28, 2004

(65) Prior Publication Data

US 2005/0077138 A1   Apr. 14, 2005

Related U.S. Application Data

(60) Provisional application No. 60/509,590, filed on Oct. 8, 2003.

(51) Int. Cl.
F16D 69/00 (2006.01)
(52) U.S. Cl. ............................. 192/107 M; 192/70.14
(58) Field of Classification Search ............. 192/70.12, 192/70.14, 107 R, 107 M
See application file for complete search history.

(56) References Cited

U.S. PATENT DOCUMENTS

| | | | |
|---|---|---|---|
| 5,029,686 A * | 7/1991 | Yesnik | 192/70.14 |
| 5,048,654 A * | 9/1991 | Yesnik | 192/70.14 |
| 5,096,661 A | 3/1992 | Lang | 419/2 |
| 5,615,758 A | 4/1997 | Nels | 192/113.36 |
| 5,662,993 A | 9/1997 | Winckler | 442/101 |
| 5,842,551 A | 12/1998 | Nels | 192/107 |
| 6,132,877 A | 10/2000 | Winckler et al. | 428/408 |
| 2003/0012940 A1 | 1/2003 | Bowles et al. | 428/297.4 |
| 2005/0077139 A1* | 4/2005 | Mordukhovich | 192/107 M |
| 2005/0077140 A1* | 4/2005 | Mordukhovich | 192/107 R |

* cited by examiner

Primary Examiner—Richard M. Lorence
(74) Attorney, Agent, or Firm—Christopher DeVries

(57) ABSTRACT

A reaction member adapted for engagement with a friction member in a torque-transmitting mechanism is provided. The reaction member includes a reaction member base and a coating formed on the reaction member base. The coating is characterized by a coefficient of friction. The coated reaction member base is selectively engageable in sliding contact with the friction member. The sliding contact is at least partially characterized by the coefficient of friction of the coating. When lubricant is disposed between the friction member and the coated reaction member base, the sliding contact is at least partially characterized by an elasto-hydrodynamic (EHD) coefficient of friction of the lubricant. When no lubricant is so-disposed (i.e., during the asperity phase), the sliding contact is characterized by the coefficient of friction of the coating, which is less than the EHD coefficient of friction, thus avoiding a high operating coefficient of friction during the asperity phase.

13 Claims, 1 Drawing Sheet

COATED REACTION PLATE FOR A CLUTCH

CROSS-REFERENCE TO RELATED APPLICATIONS

This application claims the benefit of U.S. Provisional Application No. 60/509,590, filed Oct. 8, 2003, which is hereby incorporated by reference in its entirety.

TECHNICAL FIELD

This invention relates to a coated reaction plate for use in a clutch application.

BACKGROUND OF THE INVENTION

A vehicle engine is traditionally coupled with a transmission for transmitting torque to the wheels via a torque converter. A wet friction interface may be used with the torque converter for establishing torque transfer under a slip condition (i.e., relative rotation of opposing surfaces forming the friction interface). U.S. Pat. No. 6,132,877, issued Oct. 17, 2000 to Winckler et al, assigned to General Motors Corporation, and hereby incorporated by reference in its entirety, describes a friction interface composed of a high density, low porosity, carbon composite material, infiltrated with chemical vapor deposited carbon and, preferably, having a substrate of a satin weave fabric. Another application of a friction interface used in a torque converter is described in U.S. Pat. No. 5,195,621, issued Mar. 23, 1993 to Dull et al, assigned to General Motors Corporation, and hereby incorporated by reference in its entirety. The use of friction material having a heat resistant paper support bearing resin-bonded carbon particles is known in the art, as described in U.S. Pat. No. 5,083,650, issued Jan. 28, 1992 to Seiz et al, assigned to Minnesota Mining and Manufacturing Company and to General Motors Corporation, which is hereby incorporated by reference in its entirety.

Additionally, a wet clutch with a friction interface may be used in lieu of a torque converter for vehicle launch with slip, especially on vehicles designed with a wider overall speed ratio, as the ratio-boosting affect of the torque converter may not be necessary in such an application.

In a wet clutch application, at high temperatures or at low relative velocities between the opposing surfaces forming the friction interface (i.e., between a friction member and a reaction plate) there may be an inadequate amount of fluid film separating the opposing surfaces, causing a spike in the coefficient of friction at the friction interface. When this occurs, a portion of the clutch operates in a dry, asperity phase, outside of the desired elasto-hydrodynamic (EHD) phase. Friction modifier additives are typically added to fluid in the transmission to address this problem. The friction modifier additives adhere to the reaction plate, creating a chemical tribological layer with low friction properties on the surface of the reaction plate, and serving to lower the operating coefficient of friction at the friction interface.

SUMMARY OF THE INVENTION

It is desirable to avoid operating a torque-transmitting mechanism such as a clutch or a brake in a transmission at the coefficient of friction typical of the asperity phase. Accordingly, a reaction member adapted for engagement with a friction member in a torque-transmitting mechanism of a transmission is provided. The reaction member includes a reaction member base and a coating formed on the reaction member base. The coating is characterized by a coefficient of friction. The coated reaction member base is selectively engageable in sliding contact with the friction member. The sliding contact is at least partially characterized by the coefficient of friction of the coating. As used herein, and as will be readily understood by those skilled in the art, "sliding contact" means that there is relative sliding movement (i.e., slip) between the friction member and the reaction member. The friction member and the coated reaction member base may be substantially separated from direct physical contact with one another by a layer of lubricant disposed therebetween. Alternatively, there may be little or no lubricant disposed between the friction member and the coated reaction member base during the asperity phase.

In another aspect of the invention, when lubricant is disposed between the reaction member and the friction member to substantially separate the coating and the friction member, the sliding contact is at least partially characterized by an elasto-hydrodynamic (EHD) traction coefficient of friction of the lubricant. In the absence of lubricant between the coated reaction member base and the friction member, the sliding contact is at least partially characterized by the coefficient of friction of the coating.

In yet another aspect of the invention, the lubricant is characterized by a substantial absence of friction modifier additives. As used herein, a "substantial absence" of friction modifier additives means that friction modifier additives are not present in a sufficient amount to form a chemical tribological layer on the reaction member that has a coefficient of friction sufficient to control the sliding contact.

In another aspect of the invention, the coefficient of friction of the coating does not exceed the EHD traction coefficient of friction. Accordingly, the coefficient of friction of the sliding contact will not experience a spike or jump upon entering the asperity phase.

In yet another aspect of the invention, the coating shears during the sliding contact. The coefficient of friction of the coating is at least partially affected by the shearing.

Alternatively, in yet another aspect of the invention, the reaction member base is subjected to a salt bath nitriding process to form the coating on the reaction member base. The coated reaction member base has a second hardness after the process that is greater than a first hardness of the reaction member base prior to the process. Additionally, the coated reaction member base has a second smoothness after the process that is smoother than a first smoothness of the reaction member base prior to the process.

A friction interface for a torque-transmitting mechanism includes a reaction member having a first surface and a coating disposable on the first surface. A friction member having a friction surface is also included. Sliding contact of the first surface with the friction surface is characterized by a first coefficient of friction. Sliding contact of the coating disposed on the first surface with the friction surface is characterized by a second coefficient of friction. The second coefficient of friction is less than the first coefficient of friction. Accordingly, the coating acts to reduce the coefficient of friction during sliding contact between the reaction member and the friction member, especially during the dry, asperity phase.

In another aspect of the invention, lubricant is disposable between the coating and the friction surface to separate the reaction member and the friction member. Relative sliding contact between the coating and the friction surface when the lubricant is so disposed is characterized by an EHD traction coefficient of friction of the lubricant. The sliding contact is characterized by the second coefficient of friction in the substantial absence of the lubricant between the coating and the friction surface. The second coefficient of friction does not exceed the EHD traction coefficient of friction.

In another aspect of the invention, the friction member is characterized by a first modulus of elasticity in a first direction substantially normal to the sliding contact. The friction member is further characterized by a second modulus of elasticity in a second direction substantially parallel to the sliding contact. The second modulus of elasticity is greater than the first modulus of elasticity.

In another aspect of the invention, the coating is disposed on the first surface and is characterized by a thickness of not more than 5 microns.

In yet another aspect of the invention, the coating is characterized by a thickness of substantially 3 microns.

In yet another aspect of the invention, the coating is comprised of a material that shears during the sliding contact of the adhered coating and the friction surface. The second coefficient of friction is at least partially affected by the shearing.

A power transmission includes a torque-transmitting mechanism. The torque-transmitting mechanism includes a reaction member having a reaction member base and a coating formed on the reaction member base. The coating is characterized by a coefficient of friction. The torque-transmitting mechanism further includes a friction member selectively engageable in sliding contact with the coated reaction member base. The sliding contact is at least partially characterized by the coefficient of friction of the coating. The coating at least partially controls vibrational shudder of the transmission resulting from the sliding contact.

Accordingly, a coated reaction member base acts to reduce the coefficient of friction during sliding contact during the asperity phase relative to a higher coefficient of friction that would result absent the coating.

The above features and advantages, and other features and advantages, of the present invention are readily apparent from the following detailed description of the best mode for carrying out the invention when taken in connection with the accompanying drawings.

BRIEF DESCRIPTION OF THE DRAWINGS

The drawing figure is a schematic cross-sectional view of a friction member in sliding contact with a reaction member, the reaction member having a coating adhered to it in accordance with the invention.

DESCRIPTION OF THE PREFERRED EMBODIMENTS

Figure 1:
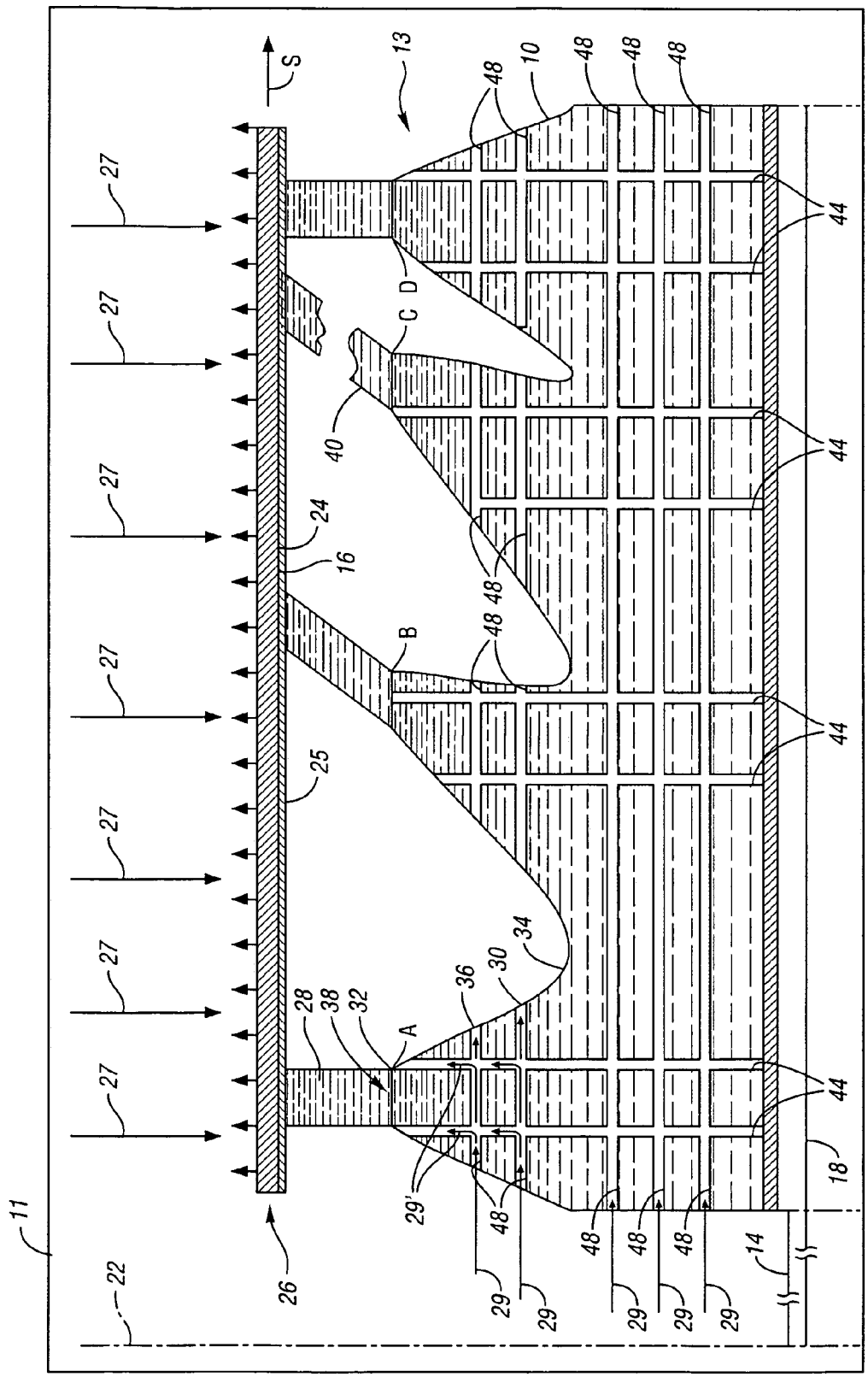

Referring to the drawing figure, a schematic radial cross section of a friction member (i.e., clutch plate) 10 for a transmission 11 is depicted. Preferably, the friction member 10 is an annular ring with an inner radius 14 and an outer radius 18 measured from a center axis of rotation 22. (A corresponding inner diameter and outer diameter are associated with the inner radius 14, and outer radius 18, respectively.) The material from which the friction member is formed has a modulus of elasticity E. The friction member 10 opposes a reaction member or reaction plate 26. The reaction member includes a reaction member base 24. A coating 25 is formed on a first surface 16 of the reaction member base 24. The friction member 10 and reaction plate 26 are included in torque-transmitting mechanism 13, which may be a clutch within a torque converter included in the transmission 11. Alternatively, the torque-transmitting mechanism 13 may be a friction interface of a rotating clutch or stationary clutch (i.e., a brake). Preferably, the reaction plate 26 is also an annular ring with a like inner and outer radius. Transmission fluid, also referred to as lubricant or oil, is disposed in the transmission. Some of the fluid forms a column of oil 28 disposed between the reaction plate 26 and the friction member 10, as depicted in the drawing figure, such that engagement of the friction member 10 and the reaction plate 26 is a "wet clutch" application.

At a microscopic level, the friction member 10 is porous with an uneven, irregular surface 30. The elevational difference between a selected peak (high portion) 32 and valley (low portion) 34 forms a peaked portion 36. (The friction member 10 has a multitude of peaked portions of various heights, only one of which is schematically depicted in the drawing figure at various stages of flex during sliding of the reaction plate 26 relative to the friction member 10.) When applied pressure (denoted by arrows 27) forces the reaction plate 26 and the friction member 10 toward one another, the actual contact area 38 (i.e., area of the friction surface 30 over which sliding contact occurs) between the plate 26 and the friction member 10 is in the vicinity of the peak 32.

During the elasto-hydrodynamic (EHD) phase of clutch engagement, the column of oil 28 is disposed between the plate 26 and the friction member 10. During engagement, it may be desirable to have a period of slip (i.e., a velocity differential, also referred to as slip speed) between the friction member 10 and the reaction plate 26 to allow for a gradual torque transmission. The coefficient of friction u (i.e., the ratio of resulting tangential force between the friction member 10 and the reaction plate 26 to the applied normal force) may vary with slip speed, as it may be more difficult for the friction member 10 to "grab" to the reaction plate 26 at high slip speeds. It is desirable to maximize the coefficient of friction u at high slip speeds for efficient torque transfer. Generally, a friction member having a low modulus of elasticity in the direction normal to the actual contact area 38 (herein referred to as a first modulus of elasticity $E_1$) will increase the actual contact area 38, thus providing a greater coefficient of friction u than a friction member with a high modulus of elasticity in the normal direction.

The coefficient of friction u is also a function of the oil viscosity and shearability at the actual contact area 38. During frictional engagement, the viscous property of the column of oil 28 in contact with the peaked portion 36 causes the peaked portion 36 to bend or flex in the direction of slide (i.e., slip) between the friction member 10 and the plate 26. The bend or flex of the peaked portion 36 is proportional to its stiffness in the direction of slide (i.e., its modulus of elasticity in the radial direction, also referred to herein as the second modulus of elasticity, $E_2$). The direction of slip or slide is denoted in the drawing figure by the arrow labeled S. As is schematically depicted in the drawing figure, during slide (i.e., slip), a given peaked portion 36 will bend from an original position A to an intermediate bent position B. At a later time, shear forces will cause the column of oil 28 at the contact area 38 to shear (depicted by sheared oil contact 40); at the shear point, the peaked portion 36, momentarily no longer subject to the viscous force of the column of oil 28, will spring back from a final bent position C to the position D, which is substantially the same as original position A. This spring-back of peaked portions during shear may contribute to vibrational shudder of the transmission. Accordingly, it is desirable to minimize the deformability of the friction member 10 in the direction of slide, thus minimizing shudder. This may be accomplished by providing a relatively high second modulus of elasticity $E_2$ in the direction of slide. The fluid pressure in the friction member 10 may also influence shudder; for instance, a highly pressurized fluid acting on the friction member 10 may increase the modulus of elasticity $E_2$.

Vibrational shudder may be minimized by increasing the modulus of elasticity $E_2$ and/or decreasing the modulus of elasticity $E_1$. Shudder caused by "self excitation" of the friction member 10 may occur if the reaction plate 26 is not flat. During use, a reaction plate that is not flat may have different localized temperatures across it (due to an irregular contact area) causing variations in the height of a typical column of oil 28 between the reaction plate 26 and the friction member 10 and thus creating variations in cooling. As discussed below, temperature variations may lead to shudder. Decreasing the modulus of elasticity $E_1$ increases the damping capability of the friction member 10, allowing it to conform to the surface area of the reaction plate 26 (which is typically not perfectly flat), thus minimizing temperature variations.

Vibrational shudder may also occur if the reaction plate 26 and friction member 10 are not parallel upon engagement. Such a misalignment will cause a portion of the friction member 10 to contact the reaction plate 26 prior to the remainder of the friction member 10, resulting in pressure variations across the friction member 10. As discussed below, pressure variations cause temperature and oil viscosity variations, which may lead to shudder.

The coefficient of friction, the operational oil viscosity and the shearability of the oil at the contact area are functions of pressure and temperature at the contact area, as well as the pressure differential between the high portion 32 (i.e., the portion of the friction member 10 in sliding contact with the reaction plate 26) and the low portion 34 (i.e., the portion of the friction member 10 out of sliding contact with the reaction plate 26). Temperature is lower at higher pressures. In fact, the actual contact temperature may be up to 300° C., at which temperature the operational viscosity is very sensitive to pressure fluctuations. Accordingly, it follows that operational oil viscosity (which increases with increased pressure) must be kept high at high temperatures in order to minimize or avoid asperity contact. It should be noted that higher slip speeds lead to increased system temperatures. Additionally, the temperature at the contact area may be controlled (i.e., minimized) by one or more of (i) keeping the applied piston pressure low; (ii) increasing the actual contact area; and (iii) controlling the flow of oil past the contact area (permitting cooling thereof) by increasing the clutch oil pressure. With respect to the second alternative above, the actual contact area may be increased by modifying the surface design of the friction member 10. Minimizing temperature at the contact area also leads to a longer useful life of the lubricant, as the rate of depletion of friction modifier additives that may be in the lubricant is decreased at lower temperatures. Additionally, the pressure and temperature at the contact area and the pressure differential are affected by and, therefore, can be controlled by controlling the modulus of elasticity in the normal direction (i.e., the first modulus of elasticity, $E_1$) and the fluid pressure in the porous friction member 10.

The fluid pressure in the friction member 10 is a function of the radial porosity of the member 10, pressure applied to the fluid from a pressure source such as a pump (not shown) and centrifugal forces acting to move fluid radially outward. With increasing clutch pressure, the coefficient of friction is increased at a given slip speed. Additionally, with fluid flow, the fluctuation or spike in the coefficient of friction u (felt as vibrational shudder) as the sliding speed approaches 0.00 m/s (i.e., near completion of clutching, after the slip launch phase) is lessened with respect to that which occurs when there is no fluid flow. The friction coefficient u typically experiences such a spike, causing shudder, near clutch completion. The coefficient of friction often decreases at higher slip speeds.

The friction member 10 is formed with first channels 44 disposed axially, in a first direction substantially normal to the sliding contact between the friction member 10 and the reaction plate 26. The first channels 44 are able to transport fluid to and from the contact area 38. Thus, the first channels 44 affect the temperature and pressure at the contact area as well as the pressure differential between the high portion 32 and low portion 34. The first channels 44 also affect the modulus of elasticity in the first direction $E_1$. Preferably, the modulus of elasticity $E_1$ is significantly less than the modulus of elasticity E of the friction member 10 formed without the channels 44. Accordingly, the design of the first channels 44 may at least partially affect (e.g., increase) the friction coefficient u of the friction member 10 during engagement.

The friction member 10 is formed with second channels 48 disposed radially, in a second direction substantially parallel to the sliding contact area 38 between the friction member 10 and the reaction plate 26. The second channels 48 increase the porosity of the frictional member 10 in the sliding direction. Preferably, the second channels 48 remain at least partially open, permitting oil flow therethrough, even under loading by normal forces between the friction member 10 and the reaction plate 26. The channels 44 and 48 of the drawing figure are shown schematically as straight parallel and perpendicular lines for illustrative purposes; however, the channels 44, 48 are likely to be irregular in practice, having sufficient porosity to allow flow in the parallel and perpendicular directions.

Movement of fluid through the member 10 helps to cool the contact area 38 and control the pressure and pressure differentials near the contact area 38 (thereby increasing the coefficient of friction). While radial and normal porosity may contribute to such movement, they may also pressurize and thereby stiffen the friction member 10, increasing the modulus of elasticity in both the first direction (i.e., $E_1$) (which may not be desirable, as discussed above) and the second direction (i.e., $E_2$) (which is desirable, as discussed above). Additionally, centrifugal forces act upon the fluid, moving it radially outward. Thus, an oil supply to the second channels 48 from the inner radius 14 of the friction member 10 (as shown by arrows 29 denoting fluid transport into the channels 48) will work with the centrifugal force whereas an oil supply from the outer radius 18 of the friction member 10 will work against centrifugal force, requiring a greater oil clutch pressure to move the fluid radially inward through the friction member 10. (Arrows 29' denote fluid transport from the channels 48 to the channels 44. Fluid transport is only shown in selected channels 44, 48, or portions thereof. Like fluid transport occurs throughout the channels 44, 48.)

Accordingly, an oil supply from the outer radius 18 to the channels 48 requires a greater fluid pressure than an oil supply from the inner radius 14 to the channels 48. A relatively greater fluid pressure leads to better shudder resistance (i.e., greater $E_2$ as described above) while a relatively lower fluid pressure leads to greater damping properties in the normal direction (i.e., lower $E_1$). The size and number of channels 44, 48 also affects the required fluid pressure to affect fluid flow through the channels, as will be readily understood to those skilled in the art. Thus, the selected size and number of the channels 44, 48, as well as the choice of supplying fluid from the inner vs. the outer radius 14, 18, respectively, allows for an optimized, dual-directional moduli of elasticity in the friction member 10.

In the presence of lubrication disposed between the friction member 10 and the reaction member 26 (e.g., such as lubricant forming the column of oil 28 of the drawing figure), the sliding contact is characterized and controlled by an EHD coefficient of friction of the lubricant. When little or no lubricant is present (e.g., during the asperity phase), the sliding contact between the friction member 10 and the reaction member 26 is at least partially characterized and controlled by a second coefficient of friction (i.e., a coefficient of friction of the coating 25) that is less than the EHD coefficient of friction. The second coefficient of friction is also less than the coefficient of friction (referred to as a first coefficient of friction) resulting from sliding contact of the (uncoated) outer surface 16 (also referred to as a first surface) of the reaction member base 24 and the friction surface 30.

The lower second coefficient of friction may be obtained by providing a "soft" coating 25 that has a low shear strength (i.e., layers of the coating slide upon one another, similar to graphite). One process that may be used to achieve such a coating is a low temperature electrolytic sulphurizing treatment, marketed as SULF BT® by HEF Corporation of France, which produces a self-lubricating (i.e., shearable in layers) coating or layer of iron sulphide at the surface of the reaction plate 26. Preferably, a coating formed by this method has a thickness of about 5 microns.

Alternatively, a low second coefficient of friction may be obtained by subjecting the reaction member base 24 to a salt bath nitriding process utilizing sulphur activated non-polluting salts, marketed as SURSULF® by HEF Corporation of France, to systematically introduce sulfur into the surface layer (thereby forming a coating 25) of the reaction member base 24. Such a surface treatment results in a hard, smooth coating 25, preventing the formation of bonds between the coating 25 and the friction member 10. The coated reaction plate 26 has a second hardness after the SURSULF® process that is greater than a first hardness that the reaction member base 24 had prior to the SURSULF® process. Additionally, the coated reaction plate 26 has a second smoothness after the SURSULF® process that is smoother than a first smoothness that the reaction member base 24 had prior to the process. Preferably, a coating formed by this method has a thickness of not more than 3 microns. Other processes may also be employed within the scope of the invention to achieve a coating on the reaction member base 24. For example, a coating may be adhered to the reaction member base 24.

The coating 25 may be applied to the reaction member base 24 and used in conjunction with the friction member 10 having a dual-directional moduli of elasticity, as described above. Alternatively, the coating 25 may be used on a reaction plate used in conjunction with a typical friction member, not designed with a dual-directional moduli of elasticity. Additionally, the coating 25 may be implemented for pump gears to alleviate wear and scoring problems.

While the best modes for carrying out the invention have been described in detail, those familiar with the art to which this invention relates will recognize various alternative designs and embodiments for practicing the invention within the scope of the appended claims.

What is claimed is:

1. A reaction member adapted for engagement with a friction member in a torque-transmitting mechanism of a transmission, said reaction member comprising:

a reaction member base;

a coating formed on said reaction member base, said coating being characterized by a coefficient of friction; wherein said coated reaction member base is selectively engageable in sliding contact with the friction member; wherein a lubricant is disposable between said coating and the friction member to substantially separate said coating and the friction member;

wherein said sliding contact is at least partially characterized by an elasto-hydrodynamic (EHD) traction coefficient of friction of said lubricant when said lubricant is so disposed;

wherein said sliding contact is at least partially characterized by said coefficient of friction of said coating in the substantial absence of said lubricant; and wherein said coefficient of friction of said coating does not exceed said EHD traction coefficient of friction.

2. The reaction member of claim 1, wherein said lubricant is characterized by a substantial absence of friction modifier additives.

3. The reaction member of claim 1, wherein said coating shears during said sliding contact, said coefficient of friction of said coating being at least partially affected by said shearing.

4. The reaction member of claim 1, wherein said reaction member base is subjected to a salt bath nitridizing process to form said coating on said reaction member base;

wherein said reaction member base is characterized by a first hardness and first smoothness prior to said process;

wherein said coated reaction member base is characterized by a second hardness and second smoothness after said process; and wherein said second hardness is greater than said first hardness and said second smoothness is smoother than said first smoothness.

5. A reaction member for engagement in a torque-transmitting mechanism of a transmission, said reaction member comprising:

a reaction member base;

a coating formed on said reaction member base, said coating being characterized by a coefficient of friction;

wherein a friction member is selectively engageable in sliding contact with said coated reaction member base, said sliding contact being at least partially characterized by said coefficient of friction of said coating;

wherein lubricant is disposable between said coating and said friction member to substantially separate said coating and said friction member;

wherein said sliding contact is characterized by an elasto-hydrodynamic (EHD) traction coefficient of friction of said lubricant when said lubricant is so disposed;

wherein said sliding contact as characterized by said coefficient of friction of said coating is in the substantial absence of said lubricant; and wherein said coefficient of friction of said coating does not exceed said EHD traction coefficient of friction.

6. A friction interface for a torque-transmitting mechanism comprising:

a reaction member having a first surface;

a coating disposable on said first surface;

a friction member having a friction surface;

wherein sliding contact of said first surface with said friction surface is characterized by a first coefficient of friction; and wherein sliding contact of said coating with said friction surface when said coating is disposed on said first surface is characterized by a second coefficient of friction, said second coefficient of friction being less than said first coefficient of friction.

7. The friction interface of claim 6, wherein lubricant is disposable between said coating and said friction surface to separate said reaction member and said friction member;

wherein sliding contact between said coating and said friction surface when said lubricant is so-disposed is characterized by an elasto-hydrodynamic (EHD) traction coefficient of friction of said lubricant;

wherein sliding contact between said coating and said friction surface as characterized by said second coefficient of friction is in the substantial absence of said lubricant; and wherein said second coefficient of friction does not exceed said EHD traction coefficient of friction.

8. The friction interface of claim 7, wherein said lubricant is characterized by a substantial absence of friction modifier additives.

9. The friction interface of claim 6, wherein said friction member is characterized by a first modulus of elasticity in a first direction substantially normal to said sliding contact;

wherein said friction member is further characterized by a second modulus of elasticity in a second direction substantially parallel to said sliding contact; and wherein said second modulus of elasticity is greater than said first modulus of elasticity.

10. The friction interface of claim 6, wherein said coating is disposed on said first surface; wherein said coating is characterized by thickness of not more than 5 microns.

11. The friction interface of claim 10, wherein said coating is characterized by a thickness of substantially 3 microns.

12. The friction interface of claim 6, wherein said coating is comprised of a material that shears during said sliding contact of said coating and said friction surface, said second coefficient of friction being at least partially affected by said shearing.

13. A power transmission comprising:
a torque-transmitting mechanism including:
a reaction member having a reaction member base;
a coating formed on said reaction member base, said coating being characterized by a coefficient of friction;
a friction member selectively engageable in sliding contact with said coated reaction member base wherein said coating at least partially controls vibrational shudder of the transmission resulting from said sliding contact; wherein lubricant is disposable between said coating and said friction member to separate said coating and said friction member;

wherein said sliding contact between said coating and said friction member when said lubricant is so-disposed is at least partially characterized by an elasto-hydrodynamic (EHD) traction coefficient of friction of said lubricant;

wherein said sliding contact between said coating and said friction member is at least partially characterized by said coefficient of friction of said coating in a substantial absence of said lubricant between said coating and said friction surface; and wherein said coefficient of friction of said coating does not exceed said EHD traction coefficient of friction.

* * * * *